(12) United States Patent
Bernard et al.

(10) Patent No.: US 12,169,002 B2
(45) Date of Patent: *Dec. 17, 2024

(54) COMPOSITE SHAFT

(71) Applicant: Crompton Technology Group Limited, Solihull (GB)

(72) Inventors: James Bernard, Brackley (GB); Jon Pethick, Leicestershire (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,863

(22) Filed: Sep. 28, 2023

(65) Prior Publication Data

US 2024/0026932 A1 Jan. 25, 2024

Related U.S. Application Data

(62) Division of application No. 15/941,015, filed on Mar. 30, 2018, now Pat. No. 11,815,133.

(30) Foreign Application Priority Data

Mar. 31, 2017 (EP) ..................................... 17164410

(51) Int. Cl.
*F16C 3/02* (2006.01)
*F16B 4/00* (2006.01)
(Continued)

(52) U.S. Cl.
CPC .............. *F16D 1/092* (2013.01); *F16B 4/004* (2013.01); *F16C 3/02* (2013.01); *F16C 3/026* (2013.01); *F16C 7/026* (2013.01); *F16D 1/072* (2013.01)

(58) Field of Classification Search
CPC .......... F16B 4/004; F16C 3/026; F16C 7/026; F16D 1/072; F16D 1/0858
See application file for complete search history.

(56) References Cited

U.S. PATENT DOCUMENTS

| 4,433,933 | A | 2/1984 | Parsons, Jr. et al. |
| 4,851,065 | A | 7/1989 | Curtz |

(Continued)

FOREIGN PATENT DOCUMENTS

| DE | 3104068 A1 | 7/1982 |
| DE | 3641632 A1 | 6/1988 |

(Continued)

OTHER PUBLICATIONS

BR Office Action for Application No. BR102018006364-2, mailed Apr. 18, 2022, 4 pages.

(Continued)

*Primary Examiner* — Michael P Ferguson
(74) *Attorney, Agent, or Firm* — CANTOR COLBURN LLP

(57) ABSTRACT

A composite shaft with an end fitting mounted on an interface region on at least one end of said shaft, and a preload structure arranged to provide a biasing force to bias the composite shaft against the end fitting; wherein the preload structure is in an interference fit with the composite shaft. The preload structure is applied to the composite shaft in a subsequent operation to the mounting of the end fitting to the shaft.

7 Claims, 3 Drawing Sheets

(51) Int. Cl.
  *F16C 7/02* (2006.01)
  *F16D 1/072* (2006.01)
  *F16D 1/092* (2006.01)

(56) References Cited

U.S. PATENT DOCUMENTS

| | | |
|---|---|---|
| 4,886,944 A | 12/1989 | Christopher et al. |
| 4,895,351 A | 1/1990 | Devaud |
| 5,309,620 A | 5/1994 | Shinohara et al. |
| 5,798,153 A | 8/1998 | Fay et al. |
| 7,247,974 B2 | 7/2007 | Bansemir et al. |
| 7,731,593 B2 | 6/2010 | Dewhirst et al. |
| 7,874,925 B2 | 1/2011 | Dewhirst |
| 8,205,315 B2 | 6/2012 | Mullen et al. |
| 9,056,431 B2 | 6/2015 | Bond et al. |
| 9,777,764 B2 | 10/2017 | Lee et al. |
| 10,087,979 B2 | 10/2018 | Shippy et al. |
| 11,815,133 B2 * | 11/2023 | Bernard ................ F16D 1/072 |
| 2006/0258469 A1 | 11/2006 | Dewhirst et al. |
| 2016/0153489 A1 | 6/2016 | Pollitt et al. |
| 2018/0163772 A1 | 6/2018 | Lewis et al. |
| 2018/0283458 A1 | 10/2018 | Bernard et al. |

FOREIGN PATENT DOCUMENTS

| | | |
|---|---|---|
| DE | 19842821 A1 | 4/2000 |
| EP | 0537035 A1 | 4/1993 |
| EP | 3203094 A1 | 8/2017 |
| FR | 2613790 A1 | 10/1988 |
| GB | 2071812 A | 9/1981 |

OTHER PUBLICATIONS

English Translation of BR Office Action for Application No. BR102018006364-2, mailed Apr. 18, 2022, 2 pages.

Extended European Search Report for International Application No. 17164410.7 dated Sep. 22, 2017, 7 pages.

* cited by examiner

COMPOSITE SHAFT

CROSS REFERENCE TO RELATED APPLICATIONS

This application is a division of U.S. application Ser. No. 15/941,015 filed Mar. 30, 2018 which claims priority to European Patent Application No. 17164410.7 filed Mar. 31, 2017, the entire contents of which are incorporated herein by reference.

TECHNICAL FIELD

The present disclosure relates to composite end connections, in particular end connections of a composite structural component made of a polymer matrix composite material. This disclosure is particularly concerned with end connections that can transmit axial loads to/from a composite structural component.

BACKGROUND

Composite structural components are typically made of a polymer matrix composite (PMC) material, often a fibre-reinforced polymer matrix composite material using glass and/or carbon fibre reinforcement, e.g. carbon fibre reinforced polymer (CFRP). Composite structural components offer the opportunity for lightweight and cost effective load transmission solutions. The largest benefits are often achieved when the load path and geometry are simple. Axial load transmission components, for example rods and struts, are ideal candidates for polymer matrix composite material and such composite structural components are extensively used on commercial aircraft. These composite structural components generally require an end connection having a complex form to interface with other components. Metals are efficient in terms of weight and cost for forming an end connection having a complex geometry. However, joining a composite structural component to a metallic component to form an end connection poses significant challenges, especially in the aerospace industry where the joint must be formed in a robust and certifiable manner.

Filament wound structures are typically formed by winding filaments such as carbon fibres around a mandrel in a helical fashion so as to build up a tube shaped shaft. The angle of the helical winding influences the properties of the shaft. For example, windings approaching 45 degrees have higher torsional properties and those higher than 45 degrees have greater properties in the hoop direction. About 45 degrees is generally optimal for torque transmission, while axial loads are best transmitted with low angle fibre, e.g. approaching 0 degrees along the length of the tube. Other techniques for manufacturing PMCs include braiding, fibre placement techniques (including AFP), prepreg wrap techniques and pultrusion methods. Composite shafts may involve several layers, with different layers having different properties. For example, the fibre angle may be varied between layers to give different properties such as for bending resistance or impact resistance.

US 2016/153489 and unpublished European patent application number 16275019.4 describe joints in which end fittings are attached to composite shafts. In such joints the transmission of forces between the composite shaft and the end fitting is partly through the teeth (helical teeth or axial splines) that are provided on the metal end fitting and cut into the composite shaft, and partly through friction between the composite shaft and the flat metal lands (i.e. portions of the overall tooth profile, between the cutting teeth, that lie parallel to the axis of the composite shaft) that are formed between the teeth as part of the tooth profile of the end fitting. The frictional part of this engagement is important for improving the wear properties of the connection. In particular, this frictional engagement provides a certain amount of preload on the joint that prevents the composite shaft from fretting (moving back and forth), which under high loads can cause wear and eventually cause joint failure. However, the provision of the flat lands in the tooth profile significantly increases the length of the end fitting which results in a lot of metal and a lot of weight which is undesirable. Additionally, the process of fitting these end fittings onto the composite shaft involves pressing or screwing the end fitting onto the shaft (either via compressive axial load or via a combination of compressive axial load and rotation) against the friction of these lands. This friction heats up the composite of the shaft and in order to combat these assembly loads, additional layers of composite are required that are not required for normal operation after joint attachment, again adding to the size and weight of the component.

In EP 16275019.4 the use of a tapered shaft and end fitting results in hoop and radial loads being applied across the composite shaft during mounting of the end fitting to the shaft. In order to resist these loads during the assembly process, temporary hoop reinforcement may be applied to the shaft prior to the joint being attached, either as a ring around the outside of the shaft or as a plug inside the hollow portion of the shaft. It is also noted that these hoop reinforcement structures add hoop stiffness and help to maintain pressure on the joint and thus they may be left in place rather than removed after assembly. However, these hoop reinforcement structures only resist unwanted deformation of the composite structure during fitting and do not themselves provide a preload to the joint, i.e. they do not bias the composite fibres prior to installation of the end fitting.

It is desirable that the connection between the shaft and other components be structurally efficient so as to minimise weight while ensuring good force transmission and good joint robustness.

SUMMARY

According to this disclosure, there is provided a composite shaft with an end fitting mounted on an interface region on at least one end of said shaft, and a preload structure arranged to provide a biasing force to bias the composite shaft against the end fitting; wherein the preload structure is in an interference fit with the composite shaft.

The preload structure is applied to the composite shaft in a subsequent operation to the mounting of the end fitting to the shaft. By applying the preload in a subsequent operation, the biasing force that is applied by the preload does not impede the mounting of the end fitting to the shaft and does not add to the friction and heat generation that is involved in that mounting process. Instead, the joint is formed under minimal stress conditions, thus allowing the shaft to be constructed only to withstand this reduced stress. The preload structure then adds a preload to the already formed joint, thus increasing its fatigue resistance and by placing the shaft into an advantageous residual stressed state prior to any operation loads increases the joint strength.

The preload structure is sized so as to be in an interference fit with the shaft, i.e. the preload structure is sized so that upon insertion it will cause a deformation in the shaft, thus squashing the fibres of the shaft against the end fitting. The shaft is thus sandwiched between the preload structure and the end fitting. The degree of interference fit may be chosen to apply a desired level of preload to the joint surfaces. The degree of interference fit may be chosen taking into account operational factors such as the expected or intended axial loads to be transmitted during use. In addition, or alternatively, the degree of interference fit may be chosen taking into account structural factors such as the diameter and/or wall thickness of the composite shaft. In addition, or alternatively, the degree of interference fit may be chosen taking into account structural factors such as the angle of the teeth on the end fitting. In addition, or alternatively, the degree of interference fit may be chosen taking into account factors that affect the radial compressive strength of the composite shaft, such as the void content, volume fraction of fibre, fibre stiffness e.g. elastic modulus, and/or selected layup of the polymer matrix composite material—one or more of which may dictate the level of preload that can be supported. In preferred examples the interference fit between the preload structure and the composite shaft is at least 80 microns, preferably at least 100 microns, more preferably at least 150 microns. This distance represents the size difference (i.e. overlap) between the size of the preload structure and the corresponding dimension of the shaft to which it is to be applied.

The end fitting is typically metallic, although it could be formed from any suitable material.

Although a purely frictional engagement may provide sufficient engagement strength in some examples, preferably the end fitting further comprises teeth engaging with the composite shaft. The teeth cut into the composite shaft and provide surfaces that can transmit forces more efficiently between the end fitting and the composite shaft. The frictional engagement between the end fitting and the composite shaft is in part determined by the tooth angle. While higher angle teeth may transmit forces more directly, if the tooth angle is too great the teeth become vulnerable to breakage. Therefore it is desirable to reduce the tooth angle with the corresponding requirement to increase the frictional force against the teeth for the equivalent load transmission.

By applying the preload structure in a subsequent operation, preload is applied to the joint after the teeth have cut into the composite shaft. If the preload structure were applied before installing the joint, the teeth would cut deeper into the shaft and the joint may still suffer from fretting problems upon high load. Instead, the teeth cut into the shaft under a lower frictional load and the frictional force between the shaft and the teeth is subsequently increased by application of the preload without any further slicing movement of the end fitting. The teeth are thus held tightly in the grooves that they have formed in the shaft.

Preferably a tooth profile taken perpendicular to the teeth comprises substantially no flat land portions (i.e. portions of the overall tooth profile that lie parallel to the axis of the composite shaft) in frictional contact with the shaft. This is in contrast to the prior art discussed above in which such lands provided much beneficial friction. The preload structure avoids the need for such additional frictional surfaces and thus the size of the end fitting can be reduced by omitting them. The result is a stronger joint for a given length and hence a weight saving. Additionally, with no flat lands the required assembly load and temperature generation is less, resulting in a further weight saving to the components as the composite shaft can be optimised for the operational loads without additional consideration for accommodating end fitting assembly loads.

The preload structure is preferably arranged to increase frictional force between the composite shaft and the end fitting to a greater level than the frictional force arising from mounting of the end fitting onto the shaft. This ensures the optimal benefits of lower friction for mounting the end fitting and higher friction once the joint (with preload) is fully formed.

While there may be some roughness on the surface of the shaft in the interface region, in some examples it is preferred that the surface of the composite shaft is smooth prior to engagement with the end fitting. This smoothness may be achieved as part of the winding and curing process or it may be achieved through grinding or another material removal process after curing of the composite.

While the shaft may be cylindrical in the interface region, in some preferred examples, in said interface region the shaft is tapered; and said end fitting comprises a surface with matching taper, the surface engaging with said interface region.

Tapering the shaft and the end fitting means that the process for engaging the two together can be accomplished in less time and over a short distance. The taper allows a certain amount of axial overlap between the two parts before contact is made between the end fitting and the interface region of the shaft. When contact is made, it is made along substantially the whole of the interface region simultaneously. Further axial movement between the two parts results in further overlap of the two parts. Importantly, the taper on the shaft exposes a significant cross section of the shaft to the end fitting and results in engagement with the end fitting across that exposed portion. This ensures that engagement is not simply with the outermost or innermost surface portion of the shaft, reducing the chance of delamination when force is transmitted across the joint.

When compared with existing methods in which a shaft is engaged with an end fitting across an interface region whose surface is parallel with the axis, the shorter engagement distance along which contact is required means that there is less heat build-up due to friction between the parts and less time is required to complete the joint (thus making assembly faster and more efficient).

In some examples, the toothed surface may comprise at least one tooth formed as a helical thread engaging with the interface region. The helical thread (or plurality of helices in the case of a multi-start thread arrangement) extends substantially circumferentially around the interface region (although also with an axial component so as to form a helix). To engage the helical thread(s) with the interface region, the end fitting and shaft are rotated relative to one another so as to twist the end fitting onto the shaft. Preferably at the same time, an axial relative movement is induced at a rate of one thread pitch per full rotation. This helps to ensure that the thread cuts into the interface region in the right direction for the thread angle. Lubricant may be used to ease the joining process. The thread angle may be varied depending on the intended loading. A high angle (close to perpendicular to the shaft axis) will be best for purely axial loads, while a lower angle will improve torque transmission properties. For example a thread angle of 45 degrees to the shaft axis gives good transmission properties for mixed torque/axial loads. To maximise the efficiency of force transfer in the axial direction (i.e. for tension/compression), it is desirable to make the thread as perpendicular as possible to the shaft axis. This has the effect of increasing the amount of cutting required to fully screw the end fitting onto the shaft for a given length of joint. However, the taper of the shaft and the end fitting reduces the distance that needs to be screwed (compared with a non-tapered joint) and thus reduces the amount of cutting making a high thread angle possible.

A multi-start thread may be used on the end fitting, i.e. one with multiple adjacent helices interleaved with one another. However, in some preferred examples the thread is a single-start thread. The multi-start thread may have advantages in reducing the number of turns required to mount the end fitting onto the shaft, but it also requires a reduction in the angle between the threads and the shaft axis (i.e. the threads must be less perpendicular to the shaft axis) which, as discussed before diverges from the ideal, perpendicular arrangement for axial load transmission.

Mounting the end fitting to the shaft via a helical thread makes the joint more suitable for transmitting axial forces than a joint that is engaged via axial splines onto the interface region. This helical attachment thus forms a tension/compression joint that is more suitable for shafts that transmit tension and/or compression forces. The present disclosure is particularly well suited to axial force transmission.

In some preferred examples the shaft is a multi-layer filament shaft and the tapered interface region exposes a plurality of layers of filaments (fibres) to the toothed surface. For example, a filament-wound shaft may typically be formed by winding filaments around a mandrel in a helix (with varying helix angle, depending on application) back and forth so as to build up multiple layers of filaments to the desired thickness. As described above, different layers may be formed with different helix angles to give different properties to the finished product. The wound filaments are normally wet-out or coated in resin so as to form a matrix of resin and filaments that is cured to solidify and form the final composite.

Tapering the interface region by cutting or grinding or by any other material removal process to expose the filament ends ensures that all, or most layers of fibres (typically helical layers of fibres) that form the shaft are engaged with the end fitting, thus ensuring excellent load sharing of forces between the end fitting and the shaft. Distributing the applied forces across more fibres, in particular across more fibre layers of the shaft greatly increases the strength of the joint. During the mounting process, in some examples the teeth of the toothed surface are driven into the composite shaft, compressing the composite material (which may include compression of the resin as well as compressing the fibres) and thus forming a very strong attachment. As more of the teeth engage with the interface region the strength of the joint increases. The teeth cut into and remove material from the composite shaft. In other examples a thread-receiving channel or spline-receiving channels may be machined (e.g. pre-cut) into the shaft prior to fitting the end fitting. This has the advantage of reducing the assembly load and hence the layers of the shaft can be optimised to suit the operational loads not the loads for assembly.

The joint is structurally efficient in terms of its strength to weight ratio. The fitting can be formed as a single piece, and can use less material (e.g. less metal) and less composite in the joint region compared with other joining techniques. This also reduces cost and is simple to manufacture and assemble.

In some examples the shaft is a hollow tube, and the taper is formed on the outside of said shaft and wherein said preload structure is provided within the hollow tube.

With the taper formed on the outside of the shaft, the outer diameter of the shaft reduces towards the end of the shaft. This forms a convex conical end to the shaft (although as the shaft is hollow, this is not a complete cone, resulting in a substantially frustoconical shaped end). The end fitting then has a concave cone shape (or frustoconical shape) that matches and engages therewith.

In such examples the preload structure may take any suitable form as long as it provides a suitable preload to the shaft. It may form a continuous circumferential structure inside the hollow shaft and engaging with its inner diameter. The preload structure may be generally cylindrical in shape. The preload structure may be solid or partially segmented. In at least some examples, the preload structure may take the form of a hoop ring or a plug.

In other examples the shaft is a hollow tube, the taper is formed on the inside of said shaft and wherein said preload structure is provided on the outside of said shaft.

With the taper formed on the inside of the shaft, the inner diameter of the shaft increases towards the end of the shaft. This forms a concave conical end to the shaft (although as the shaft is hollow, this is not a complete cone, resulting in a concave frustoconical shaped end). The end fitting then has a convex cone shape (or frustoconical shape) that matches and engages therewith.

In such examples the preload structure may take any suitable form as long as it provides a suitable preload to the shaft. It may form a continuous circumferential structure around the end of the shaft. The preload structure may be generally cylindrical in shape. The preload structure may be solid or partially segmented. In at least some examples, the preload structure may take the form of a hoop ring, collar or sleeve.

The preload structure may be made of any suitable rigid material that is capable of forming and maintaining an interference fit with the end of the shaft. In some examples, the preload structure is made of a metallic material. In some examples, the preload structure is made of a polymer matrix composite material, for example a fibre-reinforced polymer material. In some examples, the preload structure may comprise one or more materials chosen from: metals, alloys (with or without fibre reinforcement), fibre-reinforced polymers or fibre-reinforced resins.

The angle of the taper may be selected according to the desired purpose of the shaft, e.g. the expected loads to be transferred across the joint and whether the joint is for predominantly axial loading, predominantly torque loading or a mixture of both. However, generally a narrower angle of taper (with respect to the shaft axis) will result in more frictional engagement which results in a stronger joint. In some preferred examples, the taper is at an angle to the shaft axis of no more than 20 degrees, preferably no more than 15 degrees, more preferably no more than 10 degrees, more preferably still no more than 7 degrees.

In other examples, in said interface region, fibres of said composite shaft may be angled with respect to the shaft axis such that they follow a path with a radial component and have been cut so as to expose the ends of said filaments in said interface region, and wherein said shaft is a hollow tube and said preload structure is provided within the hollow tube.

The angling of the fibres in the interface region followed by cutting or grinding to expose the fibre ends ensures that all, or most layers of the helical fibres that form the shaft are engaged with the end fitting, thus ensuring excellent load sharing of forces between the end fitting and the shaft. Distributing the applied forces across more fibres, in particular across more fibre layers of the shaft greatly increases the strength of the joint.

The interface region of the shaft may comprise a ramp that increases in thickness in the axial direction of the shaft towards the end of the shaft, and helical-wound fibres wound over said ramp. The ramp can be formed from any material. In some examples the ramp may be formed from polymers, resins, metals, alloys; with or without fibre reinforcement. In the case of a hoop wound ramp, the hoop-wound fibres can easily be wound so as to accurately build up the profile of the ramp at the desired gradient, forming a conical wedge shape with its thickest part at the edge of the shaft. During forming of the shaft, the hoop section may be formed on a mandrel first. The rest of the shaft is then formed using helical wound fibres as normal, but in the region of the ramp part, the fibres are redirected radially outwardly so as to splay outwards towards the end of the shaft. After the shaft has been built up to a desired thickness, the end (above the hoop-wound ramp) will be thicker than the middle of the shaft. This thicker section is then ground down to a similar diameter to the rest of the shaft. As the fibres in this region are not parallel to the shaft, the grinding (or more generally any material removal process) step exposes the ends of fibres from lots of different layers of the composite shaft. When the end fitting is attached to overlap this interface region, the end fitting becomes engaged with all of these layers and thus shares its load transmission between all of those layers rather than concentrating load on a smaller number of surface layers. Preferably the helical-wound fibres over the ramp have been cut or ground parallel to the axis of the shaft to expose the fibre ends and form the interface region.

According to a further aspect of this disclosure, there is provided a method of mounting an end fitting to an interface region of a composite shaft comprising: mounting said end fitting to said interface region and subsequently mounting a preload structure to the composite shaft in an interference fit with the composite shaft such that the composite shaft is sandwiched between the end fitting and the preload structure.

As discussed above, the mounting of the preload structure after the mounting of the end fitting results in a stronger joint, while allowing a reduction in weight due to the reduced force for end fitting mounting.

The preferred features described above in relation to the structure of the joint apply equally to this method. In particular, the interference fit between the preload structure and the composite shaft may be at least 80 microns, preferably at least 100 microns, more preferably at least 150 microns.

Preferably the end fitting comprises a toothed surface with a helical thread; and the method comprises screwing said end fitting onto said shaft while the end fitting is driven axially at a rate equal to one thread pitch per rotation. This again minimises the forces involved in the process of mounting the end fitting to the shaft.

The mounting of the preload structure preferably increases the frictional force between the composite shaft and the end fitting to a greater level than the frictional force that arose from mounting of the end fitting onto the shaft.

The composite shaft described above may act as an actuator rod or other force transmission component. It will be appreciated that the joint described here may be used in a wide range of applications, wherever tension/compression elements or torque transmission elements may be used. Some example applications include aerospace applications such as piston rods, struts, control actuators, etc. Other applications include drive shafts or actuators for torque transmission.

It will be appreciated that as part of the process of forming a finished product, a matrix material such as resin must be provided around the fibres. This may be achieved in any of the usual manners such as by pulling the fibres through a resin bath during the fibre placement or by injecting resin into the wound fibres and mandrel after the winding process.

BRIEF DESCRIPTION OF DRAWINGS

One or more non-limiting examples will now be described, by way of example only, and with reference to the accompanying figures in which.

DETAILED DESCRIPTION

Figure 1:
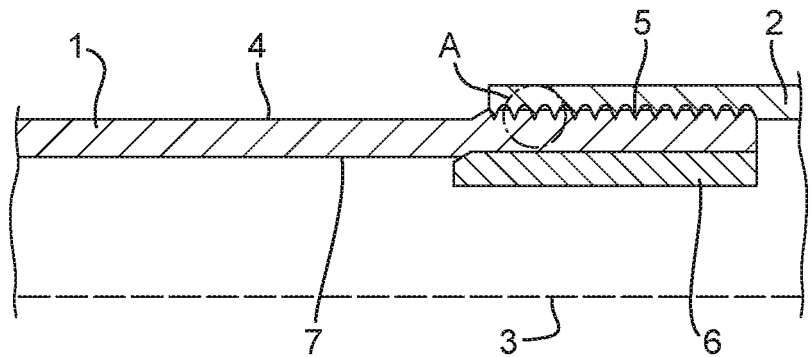
FIG. 1 illustrates a hollow composite shaft with an end fitting mounted on the outer surface and a preload structure mounted on the inner surface.

FIG. 1 shows a cross-section through a composite shaft 1 with a metal end fitting 2 fitted to the end thereof. The composite shaft is a hollow cylinder, but for simplicity only one half of it is shown, along with the axis 3 of the shaft 1 indicating the centre line of the cylinder. In FIG. 1 the end fitting 2 is mounted onto the outer surface 4 of the composite shaft 1 and is attached thereto by teeth 5. The teeth 5 are formed on the end fitting 2 as a helical thread (which may be a single thread or a multi-start thread). The teeth 5 cut into the outer surface 4 of the composite shaft 1 as the end fitting 2 is screwed onto the shaft 1 in assembly. The teeth 5 compress the composite shaft in this process, increasing the frictional force between the teeth 5 and the shaft 1.

Also shown in FIG. 1 is a preload structure 6 in the form of a cylinder of relative rigid material that is sized so that its outer diameter is slightly larger than the inner diameter of the composite shaft 1 and thus when it is pressed into the shaft 1 it forms an interference fit between the two components. This interference fit causes displacement (e.g. radially outward movement or compression) of the composite shaft 1 in the region of the interference fit, which in turn presses the outer surface of the composite shaft 1 harder against the teeth 5, thus increasing the frictional force against between the composite shaft 1 and the end fitting 2. This increased engagement force reduces the axial fretting that may otherwise occur upon repeated application of axial loads across the joint between the composite shaft 1 and the end fitting 2. This reduction in fretting improves the strength of the joint and increases its lifetime.

Figure 2:
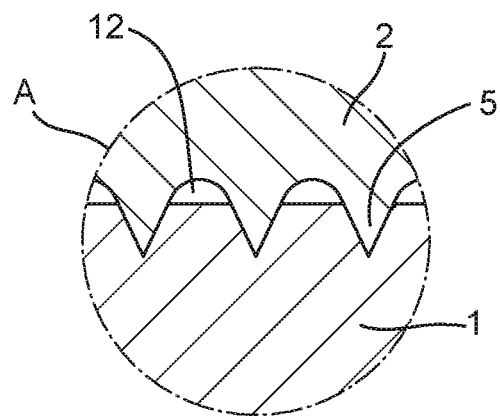
FIG. 2 shows an enlarged detail of the teeth shown in FIG. 1.

An enlarged view of the teeth 5 of end fitting 2 engaging with the composite shaft 1 is shown in FIG. 2 (the enlarged portion being marked with the letter A in FIG. 1). As can be seen in FIG. 2, the teeth 5 are designed to engage with the shaft 1 such that a small clearance 12 is provided above the composite shaft's outer surface 4 between adjacent teeth 5. This clearance 12 provides room for material that is cut or displaced by the cutting of the shaft 1 that takes place during assembly. It can also be seen in FIG. 2 that there are no flat land portions between the adjacent teeth 5 for providing increased friction. The preload structure 6 allows for such additional friction-generating surfaces to be omitted, thus allowing the end fitting 2 to be shorter and thus lighter and less expensive. The absence of flat lands between teeth reduces the heat build up that would otherwise occur due to the increased friction as the shaft 1 and the end fitting 2 engage over a longer length towards the end of the assembly process.

Figure 3:
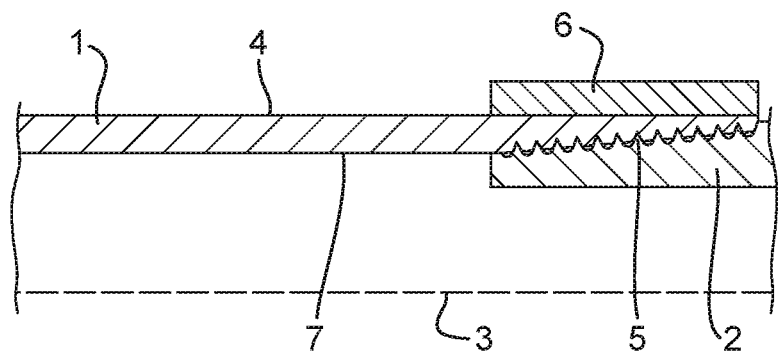
FIG. 3 illustrates a hollow composite shaft with an end fitting mounted on the inner surface and a preload structure mounted on the outer surface.

FIG. 3 is similar to FIG. 1, but shows an end fitting 2 that is attached to the inner diameter 7 of the hollow composite shaft 1. Also, whereas FIG. 1 shows a cylindrical shaft 1 and a cylindrical end fitting 2, FIG. 3 shows a tapered shaft 1 and a matching tapered end fitting 2. The taper allows for engagement of the two components 1, 2 to be accomplished with a reduced number of turns and thus a reduced build up of heat from friction that might otherwise compromise the composite material, reducing its strength. In FIG. 3 as the end fitting 2 is applied to the inner surface 7 of composite shaft 1, the preload structure 6 is formed as a hollow annulus that surrounds the shaft 1, engaging with its outer surface 4. Again, the preload structure 6 is formed to engage with the shaft 1 in an interference fit, although in this arrangement the inner diameter of the preload structure 6 is formed slightly smaller than the outer diameter of the composite shaft 1 so that the composite shaft 1 is squashed or displaced inwardly by application of the preload structure.

Figure 6:
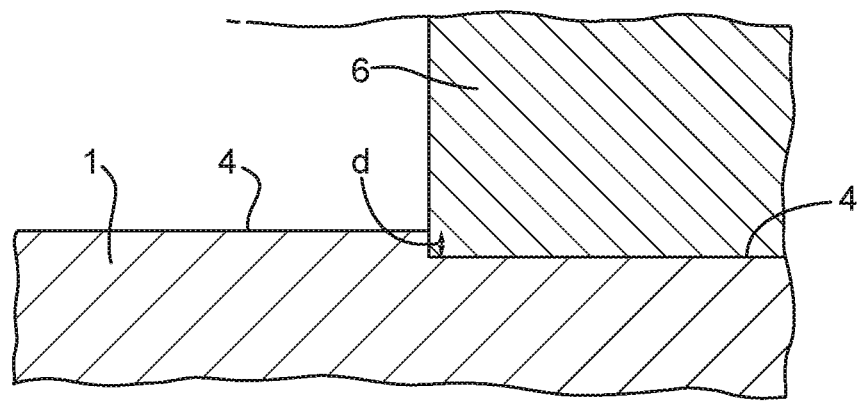
FIG. 6 shows an interference fit on an enlarged scale.

The difference in dimensions, d between the shaft 1 and the preload structure 6 will depend on the particular joint, materials and application amongst other factors. The difference d is shown in FIG. 6 which is a highly enlarged view of an annular preload structure 6 such as that shown in FIG. 3.

Figure 4:
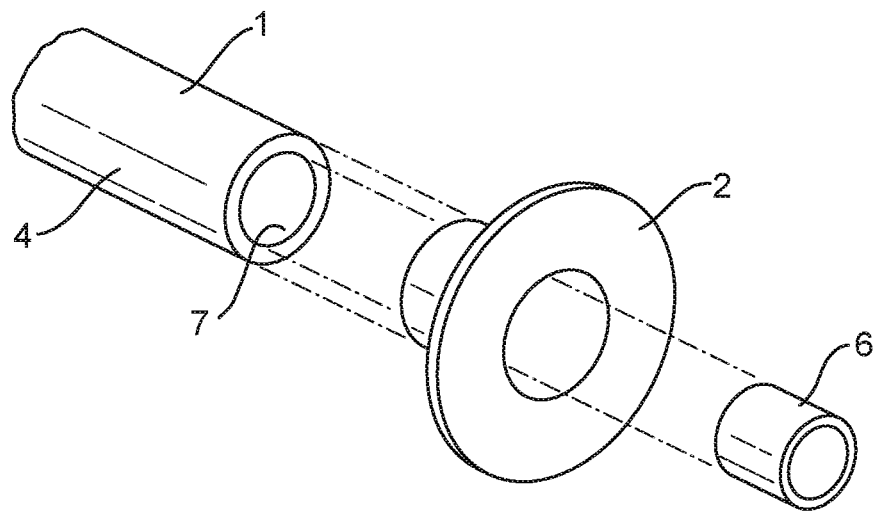
FIG. 4 illustrates the assembly of an end fitting onto a shaft.

FIG. 4 illustrates the assembly of an end fitting 2 onto a hollow composite shaft 1 such as is illustrated in FIG. 1. First the end fitting 2 is attached to the outer surface of the composite shaft 1, e.g. by screwing it on such that teeth 5 (not visible in FIG. 4) cut into the outer surface 4 of shaft 1. Then, after the end fitting 2 has been applied to the outer surface 4 of shaft 1, the preload structure 6 is pressed into the inside of the hollow shaft 1 so as to engage with the inner surface 7 of hollow shaft 1 in an interference fit, pressing the composite material of shaft 1 more firmly against the inner surface of end fitting 2.

Figure 5:
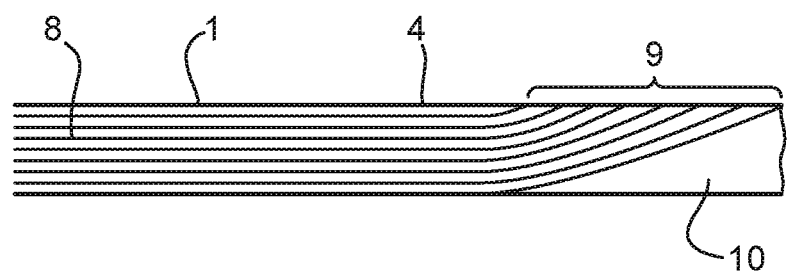
FIG. 5 shows in cross-section a ramp for exposing fibre ends in an interface region.

FIG. 5 shows in cross-section an example of how the fibres 8 in the composite shaft 1 can be angled up to the outer surface 4 of the shaft 1 in an interface region 9 by providing a ramp structure 10 around which the fibres 8 are wound during formation of the composite shaft 1. The ramp 10 deflects the fibres 8 radially outwardly. After curing of the shaft 1, the area above the ramp 10 is ground down to the level of the rest of the shaft, thus exposing the ends of the fibres 8 in the interface region 9. As can be seen in FIG. 5, when an end fitting 2 is attached to this interface region 9, the end fitting engages with a greater number of layers of fibres 8 rather than just the surface layers, thus improving the strength and load-transmission properties of the joint.

Figure 7:
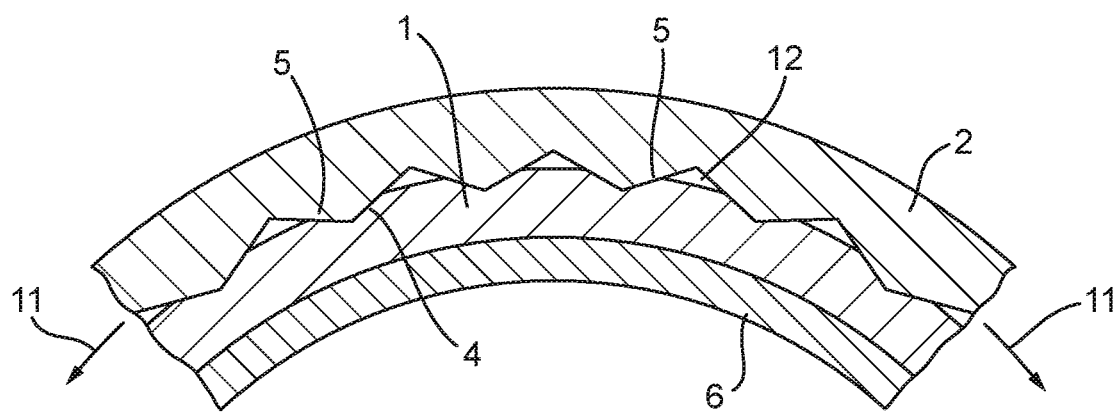
FIG. 7 shows a cross-section of a joint for torsional loads.

While the joints illustrated in FIGS. 1 and 3 are optimised for axial loads (as the teeth run essentially perpendicular to such loads), FIG. 7 illustrates that the teeth can equally be formed as axial splines rather than helical teeth, thus optimising the joint for torsional loads as indicated by arrows 11. FIG. 7 shows a cross-section of a joint between a composite shaft 1 and an end fitting 2 with teeth 5 in the form of axial splines. The cross-section is taken perpendicular to the axis 3 of the shaft 1.

In particular the teeth 5 shown in FIG. 7 are illustrated with a low angle tooth profile. The low angle means that the surfaces of the teeth 5 are closer to parallel with the outer surface of the shaft 1 such that the additional frictional force generated by the interference fit of the preload structure 6 has a large component parallel to the shaft surface 4 to resist movement between the shaft 1 and end fitting 2. Such low angle tooth profile can of course also be used in the examples illustrated in FIGS. 1 and 3 as well. As with FIG. 2, a clearance 12 is provided between adjacent teeth 5 to collect cut or displaced material.

The invention claimed is:

1. A composite shaft comprising:
   a hollow tubular shaft body comprising an inner surface and an outer surface and extending along a shaft axis, with an interface region on at least one axial end of said shaft, wherein in said interface region the shaft body has a taper formed on the inner surface of the shaft;
   an end fitting mounted on the interface region of at least one axial end of said shaft, wherein the end fitting comprises a hollow tubular body comprising a toothed surface comprising teeth formed as a helical thread engaging with the interface region and with a taper matching the taper of the shaft body, wherein the helical thread cuts into the inner surface of the shaft, and wherein a tooth profile taken perpendicular to the teeth comprises substantially no flat land portions in frictional contact with the shaft;
   wherein in said interface region fibres of said composite shaft are angled with respect to the inner surface toward or away from the outer surface of the shaft such that they follow a path with a radial component and have been cut so as to expose the ends of said fibres in said interface region; and
   a preload structure provided on the outside of the shaft body and arranged to provide a biasing force to bias the shaft against the end fitting, wherein the preload structure comprises a body with a surface in an interference fit with the outer surface of the shaft;
   wherein the preload structure is coaxially inserted over the axial end of the shaft subsequently to the end fitting being threadably engaged therewith such that the shaft is deformably clamped radially to compress the shaft against the helical thread of the end fitting, and wherein the preload structure is arranged to increase friction between the shaft and the end fitting to a greater level than the friction arising from mounting of the end fitting onto the shaft.

2. A composite shaft as claimed in claim 1, wherein the interference fit between the preload structure and the composite shaft is at least 80 microns.

3. The composite shaft as claimed in claim 2, wherein the interference fit between the preload structure and the composite shaft is at least 150 microns.

4. A composite shaft as claimed in claim 1, wherein the taper is at an angle to the shaft axis of no more than 20 degrees.

5. A composite shaft as claimed in claim 1, wherein the interface region of the shaft comprises a ramp that increases in thickness in the axial direction of the shaft towards the end of the shaft, and helical-wound fibres wound over said ramp.

6. A composite shaft as claimed in claim 1, wherein the taper is at an angle to the shaft axis of no more than 10 degrees.

7. A composite shaft as claimed in claim 1, wherein the taper is at an angle to the shaft axis of no more than 7 degrees.

* * * * *